(12) United States Patent
Chou

(10) Patent No.: US 9,277,764 B2
(45) Date of Patent: Mar. 8, 2016

(54) JUICER WITH PRE-TRITURATING DEVICE

(75) Inventor: Wenhung Chou, Guangdong (CN)

(73) Assignee: T.F. Electrical Technology (Shenzhen) Co., Ltd., Shenzhen, Guangdong (CN)

( * ) Notice: Subject to any disclaimer, the term of this patent is extended or adjusted under 35 U.S.C. 154(b) by 289 days.

(21) Appl. No.: 13/982,868

(22) PCT Filed: Jan. 18, 2012

(86) PCT No.: PCT/CN2012/070540
§ 371 (c)(1),
(2), (4) Date: Jul. 31, 2013

(87) PCT Pub. No.: WO2013/107008
PCT Pub. Date: Jul. 25, 2013

(65) Prior Publication Data
US 2014/0033934 A1    Feb. 6, 2014

(30) Foreign Application Priority Data
Jan. 17, 2012    (CN) .......................... 2012 1 0013908

(51) Int. Cl.
*A23N 1/00* (2006.01)
*A23N 1/02* (2006.01)
*A47J 19/02* (2006.01)
*A47J 43/07* (2006.01)

(52) U.S. Cl.
CPC *A23N 1/02* (2013.01); *A23N 1/003* (2013.01); *A47J 19/02* (2013.01); *A47J 19/027* (2013.01); *A47J 43/0722* (2013.01)

(58) Field of Classification Search
CPC ........... A23N 1/003; A23N 1/00; A23N 1/02; A47J 19/02; A47J 19/027

USPC .................. 99/502, 495, 510, 511, 512, 513; 100/213; 241/282.1, 282.2
See application file for complete search history.

(56) References Cited

U.S. PATENT DOCUMENTS

| 428,947 | A | * | 5/1890 | Prince | 99/502 |
| 2,541,084 | A | * | 2/1951 | Meier et al. | 99/511 |

(Continued)

FOREIGN PATENT DOCUMENTS

| CN | 1630799 | 6/2005 |
| CN | 101912227 | 12/2010 |

(Continued)

OTHER PUBLICATIONS

International Search Report filed in PCT/CN2012/070540.

*Primary Examiner* — Reginald L Alexander
(74) *Attorney, Agent, or Firm* — Rankin, Hill & Clark LLP

(57) ABSTRACT

The present invention provides a pre-triturating device, for solving a problem that the food should be pre-processed in the prior art to make the user inconvenient. According to the problem described above, after the pre-triturating device of the present invention is installed in the food processing machine, by connection between the driving shaft or the shaft hole and the shaft hole or the connecting shaft of the center of the bottom surface of the pre-triturating device, in the pre-triturating procedure, the user can relieve the food pre-processing procedure when processing the food, and the processing food is easier and quicker. Because the food is pre-triturated, the loader of the mixed device is reduced, the life of the machine is prolonged, and the mixing or squeezing juice efficiency is increased.

9 Claims, 11 Drawing Sheets

(56) References Cited

U.S. PATENT DOCUMENTS 2,995,165 A * 8/1961 Menne .......................... 99/511
4,640,467 A    2/1987 Takeuchi
8,082,841 B2 * 12/2011 Horche Trueba et al. ...... 99/502
8,677,894 B2 *  3/2014 Turgeman et al. .............. 99/510

FOREIGN PATENT DOCUMENTS

| CN | 201790542 | 4/2011 |
| CN | 201987253 | 9/2011 |
| CN | 202051496 | 11/2011 |
| CN | 202051589 | 11/2011 |

* cited by examiner

JUICER WITH PRE-TRITURATING DEVICE

FIELD

The present invention relates to a field of food processing equipment, and more particularly to a food pre-processing machine.

BACKGROUND

In food processing field, wide use of a juicer brought rich and colorful enjoy to people's diet life. People can choose all kinds of fruit and vegetable to be chopped by using the mixer to forming a mixed fruit juice, or squeezing the juice of food by using a juicer for people's enjoying. However, this kind of food processing equipment usually need the food to be cut in a certain size by artificial means, so that the cut food can be adapted to be processed by the juicer, that increases a pre-procedure in use and bring inconvenience to users at the same time. Furthermore, if the food volume is not pre-processed before entering into juice squeezing or mixing zone, a load of the mixing head would be increased and the mixer or juicer would even be damaged.

SUMMARY

An object of the present invention is to provide a pre-triturating device of a food processing machine, which can solve the inconvenient problem of pre-processing the food for users in the prior art.

In order to solve the above problem, the present invention provides a pre-triturating device of a food processing machine, the pre-triturating device is cone in shape, at least one blade is disposed on the cone surface of the pre-triturating device, a connecting shaft or a shaft hole is respectively disposed on the tip and the center of the bottom surface of the cone, configured for be in connection with the food processing machine.

Preferably, a horizontal blade and/or a vertical blade and/or an oblique blade are disposed on the cone surface of the pre-triturating device.

According to the technical problem described above, after the pre-triturating device provided by the present invention is installed in the food processing machine, with a drive shaft or a shaft hole of the food processing machine being connected to the shaft hole or the connecting shaft in the center of the bottom surface of the pre-triturating device, the pre-triturating device is driven to rotate. The tip of the pre-triturating device is secured to a top portion of the food processing machine to form a support point at the same time, to ensure the pre-triturating device is rotated about a rotating axis formed by the tip and the center of the bottom surface of the pre-triturating device and cannot be offset. The blade on the surface of the pre-triturating device cuts the large piece of food passing through the pre-triturating device, to have some of the large piece of food successfully enter into a mixed zone to be mixed or juiced. With the pre-triturating procedure, the user can relieve the pre-triturating procedure when processing the food, and it is easier and quicker in the processing food. Because the food is pre-triturated, the loader of the mixed device is reduced, the life of the machine is prolonged, and the mixing or juicing efficiency is increased.

A juicer is further provided in the present invention and includes a base with a driving mechanism, squeezing device located above the base, and a top cover with an input opening disposed above the squeezing device, wherein the pre-triturating device of the food processing machine of claim 1 or 2 is located between the squeezing device and the top cover.

Further, the squeezing device includes:
a separator capable of separately discharge juice and residual of the squeezed food;
a filter capable of filtering the residual of the squeezed food; and
a rotating head capable of rotating to spirally squeeze the squeezed food;
wherein the bottom of the sidewall of the separator defines a juice output opening, the bottom of the separator defines a residual output opening, the bottom of the filter defines a residual output hole moveably communicating with the residual output opening, a downward spiral piece is located on the outer surface of the rotating head, the rotating head is located in the separator, the filter surrounds between the rotating head and the separator, a driving end of the driving mechanism of the base is connected to a center of a bottom of the rotating head, and the rotating head is rotated reversely to the filter.

Preferably, a shaft hole or a connecting shaft is disposed on the inner surface of the top portion of the top cover and in connection with the connecting shaft or the shaft hole of the tip of the pre-triturating device, a shaft hole or a connecting shaft is disposed on the top of the rotating end and in connection with the connecting shaft or the shaft hole of the center of the bottom surface of the pre-triturating device. Preferably, a cutting quantity controller is arranged on a bottom edge of the top cover, the cutting quantity controller is sector, and a top thereof defines a through hole configured for the connecting shaft of the rotating head or the connecting shaft of the center of the bottom surface of the pre-triturating device passing through.

Preferably, a cutting quantity controller is arranged on a top edge of the separator, the cutting quantity controller is sector in shape, and a top thereof defines a through hole for the connecting shaft of the rotating head or the connecting shaft of the center of the bottom surface of the pre-triturating device inserting through.

Preferably, a ring slot is defined between an outer edge and the center of the bottom end of the rotating head, a protrusion protrudes downward from the outer edge of the bottom end of the rotating end, a ring piece, with a greater diameter than that of the through hole, is disposed in the periphery of the through hole of the inner surface of the filter, an outer diameter of the ring piece is equal to the diameter of the ring slot, the bottom portion of the filter defines the through hole, a ring outer rim protrudes downward from the periphery of the through hole of the outer surface of the bottom portion of the filter, the residual output hole is defined in the periphery of the outer rim, a second ring slot is defined in the periphery of the residual output hole, the inner surface of the bottom portion of the separator defines a second through hole, the periphery of the second through hole defines a third slot configured to receive the outer rim, a ring flange is disposed on the periphery of the third slot and configured to be received in the second ring slot, a residual output platform is disposed between the ring flange and the third slot, the residual output hole of the residual output opening is defined in the residual output platform, a ring juice channel is disposed between the ring flange and the inner sidewall of the separator and communicates with the juice output opening of the separator.

Preferably, a fixed brush is longitudinally disposed on the inner surface of the sidewall of the separator and tightly touches the outer surface of the filter.

Preferably, a ferrule is laterally disposed on the center of the outer surface of the filter, and a rib is vertically disposed on the inner surface of the filter.

Preferably, a drive gear is horizontally disposed on the center of the bottom end of the rotating head, a drive hole or a drive head with a polygonal section is disposed in the center of the drive gear, a diameter of the driving gear is less than that of through hole, a ring inner gear is disposed between the through hole and the outer rim in the outer surface of the bottom of the filter, at least one follower gear is disposed on inner surface of the bottom portion of the separator, the follower gear is located beside the second through hole, the drive gear is inserted through the through hole to mesh with the follower gear, the follower gear simultaneously meshes with the inner gear.

Preferably, a second driving end is further disposed on the base, a driver is disposed between the through hole and the outer rim of the outer surface of the bottom portion of the filter, the driver is connected to the second driving end, and a diameter of the second through hole is greater than that of the driver.

According to the technical project described above, after the juicer provided by the present invention is assembled, the base, the squeezing device, and the top cover are arranged from bottom to top. The rotating head, the filter, and the separator are arranged from inside to outside in the squeezing device. When the juicer is started up to process the food, the food to be juiced is placed in the top cover via the food input opening. The rotating head is driven to rotate by the driving end and simultaneously rotates the pre-triturating device. The food is cut into small pieces by the blade on the surface of the pre-triturating device and fall in the squeezing device. The food is transferred downward by the rotating head and squeezed and juiced by the rotating head and the filter. The juice flows through the through holes of the filter to between the outer wall of the filter and the inner wall of the separator. The juice flows to between the outer wall of the filter and the inner wall of the separator through the through hole of the filter. The juice is output through the output opening defined in the bottom portion of the inner wall of the separator. The user can get the juice via the juice output opening. The food is squeezed by the rotating head and the filter in opposite directions to form the residual. The residual is continually squeezed rotationally by the rotating end to the residual output hole in the bottom of the filter, entered into the residual output opening during being rotated, and then outputted. All the procedure for squeezing juice is finished. Because the rotation speed of the rotating head is low, the juice is not produced by the sharp blade with high speed, but by use of the opposite rotation directions of the rotating head and the filter to have the rotating head and the filter to cooperatively squeeze the juice. Not only the residual hanged on the filter can be removed by friction, but also the juice taste and nutritional ingredients can be remained. Comparing with the prior art, a rotation brush, which is rotated reverse to the rotating head or a rotating shaft, is reduced. The reduction of assembled components not only can cost down the cost, but also the possibility of mechanical failure can be effectively reduced, to further ensure the product to normally work. Because the filter is rotated reverse to the rotating head, but not fixed by claw type mounting member, that can avoid that the claw mounting member is broken when exerted by force or perished to result the filter and the rotating head to rotate in a same direction to completely scrap the juicer. The hidden defects of the products can be removed.

DETAILED DESCRIPTION

In order to more distinctly describe the object, the project, and the advantage of the present invention, combination of figures and embodiments is described in following, to illustrate the present invention in detail. It should be known that, the embodiments described here are only used to explain the present invention, but not to restrict the present invention.

First Embodiment

Figure 1:
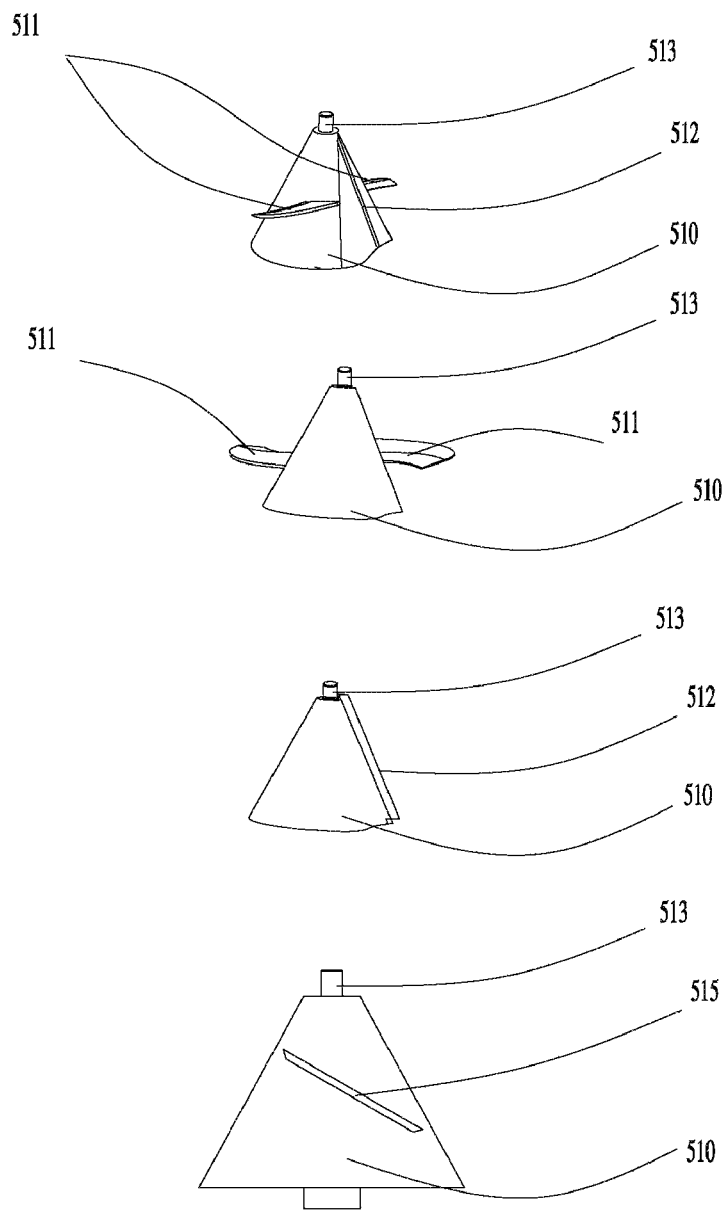
FIG. 1 is an isometric view of pre-triturating devices of the present invention.
Figure 2:
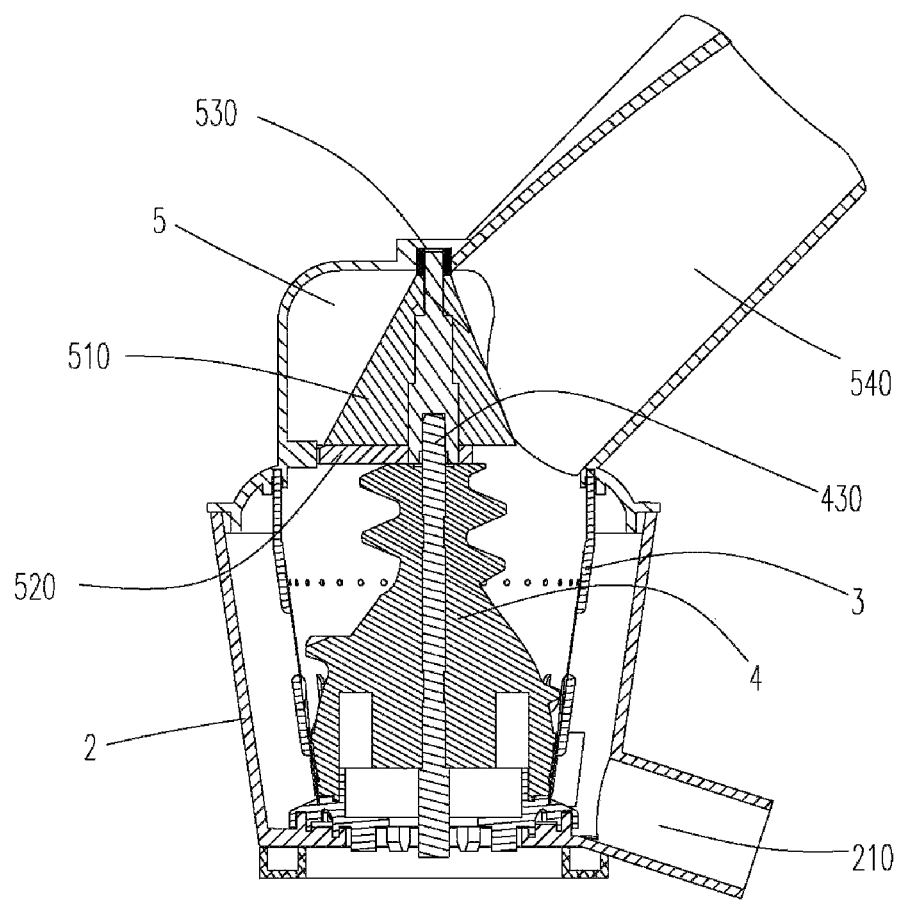
FIG. 2 is a cross-sectional view of an assembly of an squeezing device and a top cover of a juicer.
Figure 3:
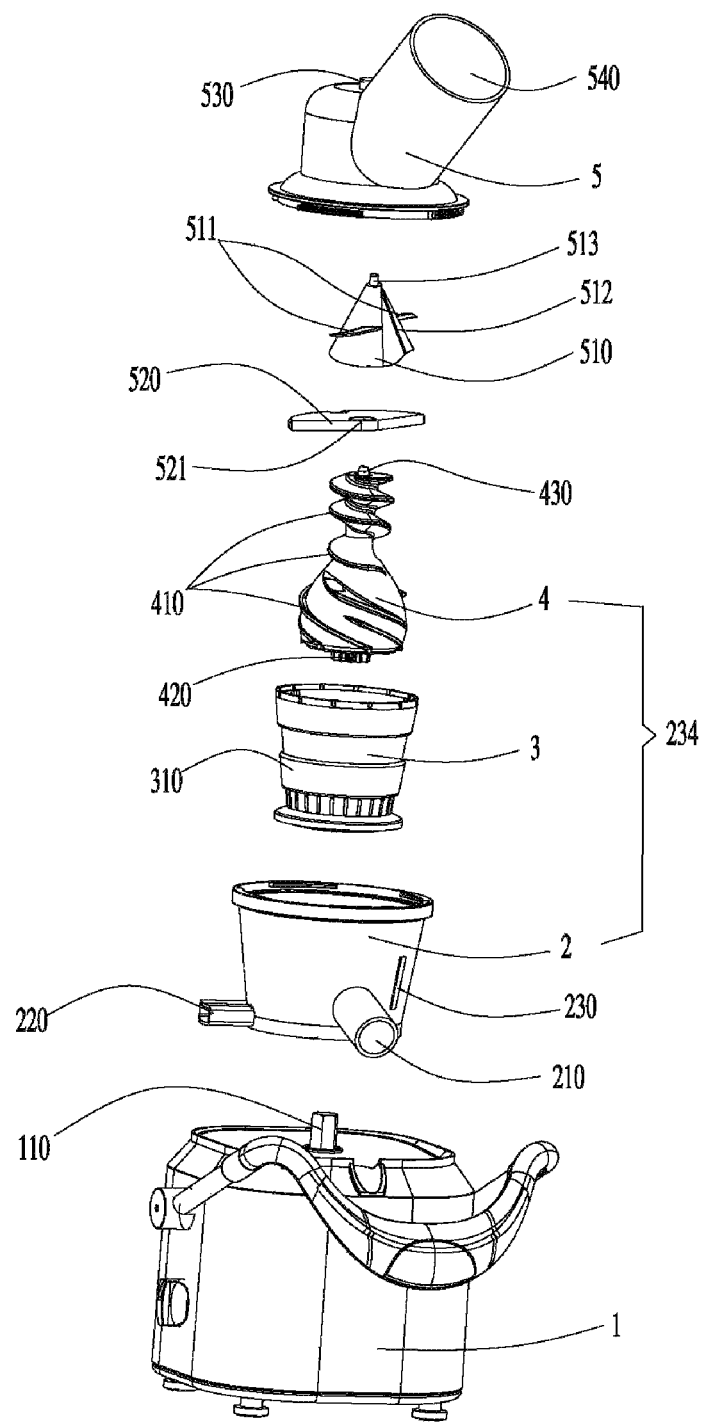
FIG. 3 is an exploded view of the juicer of the present invention.

Referring to FIGS. 1 and 2, a pre-triturating device 510 of a food processing machine is provided in an embodiment of the present invention. The pre-triturating device 510 is cone in shape. At least one blade is disposed on the cone surface of the pre-triturating device 410. A connecting shaft 413 or a shaft hole (not shown) is respectively disposed on the tip and the center of the bottom surface of the pre-triturating device 510, for connecting with the food processing machine.

According to the technical problem described above, after the pre-triturating device 510 provided by the present invention is installed in the food processing machine, with a drive shaft 430 or a shaft hole of the food processing machine being connected to the shaft hole or the connecting shaft in the center of the bottom surface of the pre-triturating device 510, the pre-triturating device 510 is driven to rotate. The tip of the pre-triturating device 510 is secured to a top portion 530 of the food processing machine to form a support point at the same time, to ensure the pre-triturating device 510 is rotated about a rotating axis formed by the tip and the center of the bottom surface of the pre-triturating device 510 and cannot be offset. The blade 511, 512 on the surface of the pre-triturating device 510 cuts the large piece of food passing through the pre-triturating device, to have some of the large piece of food successfully enter into a mixed zone to be mixed or juiced. With the pre-triturating procedure, the user can relieve the pre-triturating procedure when processing the food, and it is easier and quicker in the processing food. Because the food is pre-triturated, the loader of the mixed device is reduced, the life of the machine is prolonged, and the mixing or juicing efficiency is increased.

In order to cut the large piece of food in smaller pieces, it is preferable that a horizontal blade 511, or a vertical blade 512, or oblique blade 515, or a combination of the three types of the blades describe above, or combinations of any two of the three types of the blades described above are disposed on the cone surface of the pre-triturating device. An angle defined between the oblique blade 515 and the horizontal surface is in a range from 10 to 80 degrees, preferably 30 degrees, to further increase the cutting effect of the food.

Second Embodiment

Referring to FIGS. 1 to 7, a juicer of the embodiment provided in the present invention includes a base 1 with a driving mechanism, an squeezing device 234 located above the base 1, and a top cover 5 with a food input opening 540 located above the squeezing device 234. The pre-triturating device 510 of the food processing machine of the first embodiment is located between the squeezing device 234 and the top cover 5. The food is entered in the top cover 5 via the food input opening 540 and then rotationally cut by the pre-triturating device 510 to fall in the squeezing device 234 to be squeezed. The squeezing device 234 receives the pre-processed food that can increase efficiency and finely process the food. The squeezing device 234 can be a mixer to mix the food, or a juicer to cut the food with a juice blade, or a juicer to squeeze the food by a squeezing method.

Figure 4:
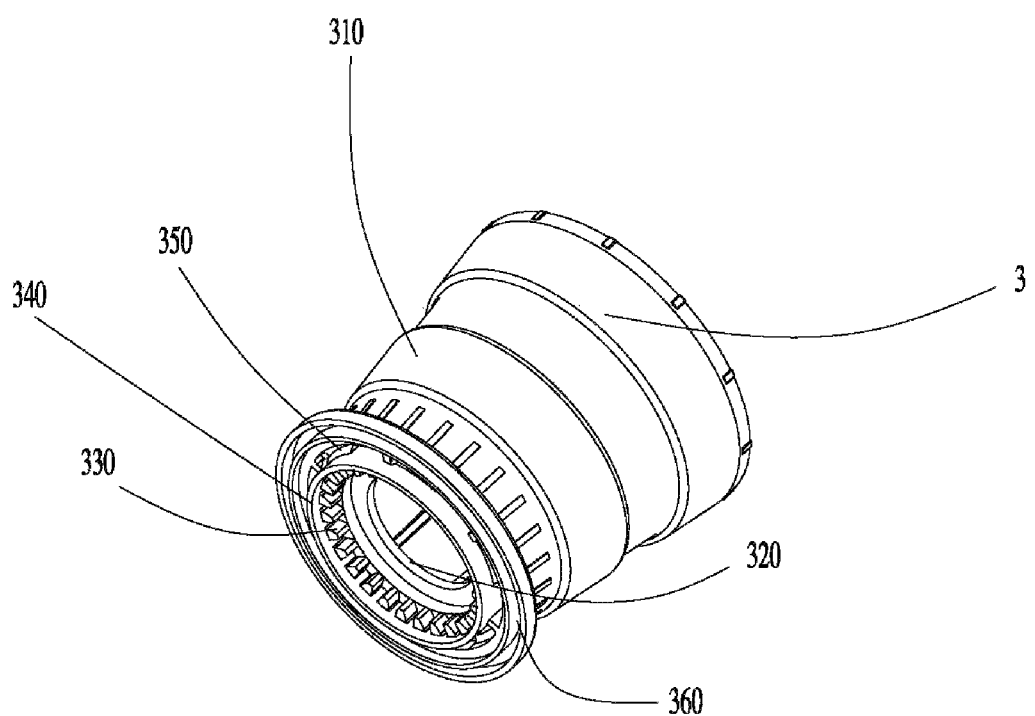
FIG. 4 is an isometric view of a filter of the juicer of the present invention.

Further, the squeezing device 234 includes: a separator 2 capable of separately outputting the juice and the residual of the juiced food, a filter 3 capable of filtering the residual of the juiced food, and a rotating head 4 capable of rotationally squeezing the juiced food. A juice output opening 210 is defined in a sidewall of a bottom portion of the separator 2. A residual output opening 220 is defined in the bottom portion of the separator 2. Referring to FIG. 4, a residual output hole 350, moveably communicating with the residual output opening 220, is defined in a bottom portion of the filter 3. A spiral piece 410 is spiraled downward and obliquely disposed on the outer surface of the rotating head 4. The rotating head 4 is arranged in the separator 2. The filter 3 surrounds between the rotating head 4 and the separator 2. A driving end 110 of the driving mechanism of the base 1 is connected to a center of the bottom end of the rotating head 4. The rotating head 4 is rotated reverse to the filter 3. After the juicer is assembled, the base 1, the squeezing device 234, and the top cover 5 are arranged from bottom to top. The rotating head 4, the filter 3, and the separator 2 are arranged from inside to outside in the squeezing device 234. When the juicer is started up to process the food, the food to be squeezed is placed in the top cover via the food input opening. The rotating head 4 is driven to rotate by the driving end 110 and simultaneously rotates the pre-triturating device 510. The food is cut into small pieces by the blade 511, 512 on the surface of the pre-triturating device 510 and fall in the squeezing device 234. The food is transferred downward by the rotating head 4 and squeezed to be juiced by the rotating head 4 and the filter 3. The juice flows through the through holes of the filter 3 to between the outer wall of the filter 3 and the inner wall of the separator 2. The juice flows to between the outer wall of the filter 3 and the inner wall of the separator 2 through the through hole of the filter 3. The juice is output through the output opening 210 defined in the bottom portion of the inner wall of the separator 2. The user can get the juice via the juice output opening 210. The food is squeezed by the rotating head 4 and the filter 3 in opposite directions to form the residual. The residual is continually squeezed rotationally by the rotating end 4 to the residual output hole 350 in the bottom of the filter 3, entered into the residual output opening 220 during being rotated, and then outputted. All the procedure for squeezing juice is finished. Because the rotation speed of the rotating head 4 is low, the juice is not produced by the sharp blade with high speed, but by use of the opposite rotation directions of the rotating head 4 and the filter 3 to have the rotating head and the filter to cooperatively squeeze the juice. Not only the residual hanged on the filter can be removed by friction, but also the juice taste and nutritional ingredients can be remained. Comparing with the prior art, a rotation brush, which is rotated reverse to the rotating head 4 or a rotating shaft, is reduced. The reduction of assembled components not only can cost down the cost, but also the possibility of mechanical failure can be effectively reduced, to further ensure the product to normally work. Because the filter 3 is rotated reverse to the rotating head 4, but not fixed by claw type mounting member, that can avoid that the claw mounting member is broken when exerted by force or perished to result the filter 3 and the rotating head 4 to rotate in a same direction to completely scrap the juicer. The hidden defects of the products can be removed.

Further, a shaft hole 530 or a connecting shaft is disposed on the top portion of the inner surface of the top cover 5 to be connected to the connecting shaft 513 or the shaft hole of the tip of the pre-triturating device 510. A shaft hole or a connecting shaft 430 is disposed on the top end of the rotating head 4 to be connected to the connecting shaft or the shaft hole (not shown) of the center of the bottom surface of the pre-triturating device 510. After assembly, the top end of the rotating head 4 and the inner surface of the top portion of the top cover 5 act as support points to support the pre-triturating device 510, to ensure the pre-triturating device 510 to be stably rotated.

Further, referring to FIG. 2, a cutting quantity controller 520 is disposed on a bottom edge of the top cover 5. The cutting quantity controller 520 is sector in shape, and the top thereof defines a through hole 521 configured for the connecting shaft 430 of the rotating head 4 or the connecting shaft on the center of the bottom surface of the pre-triturating device 510 passing through. In detail operating procedure, the food is entered in the food input opening 540 and cut by the pre-triturating device 510. The food is blocked by the cutting quantity controller 520 to prevent excessive food to influence the squeezing effect of the rotating head 4.

Figure 5:
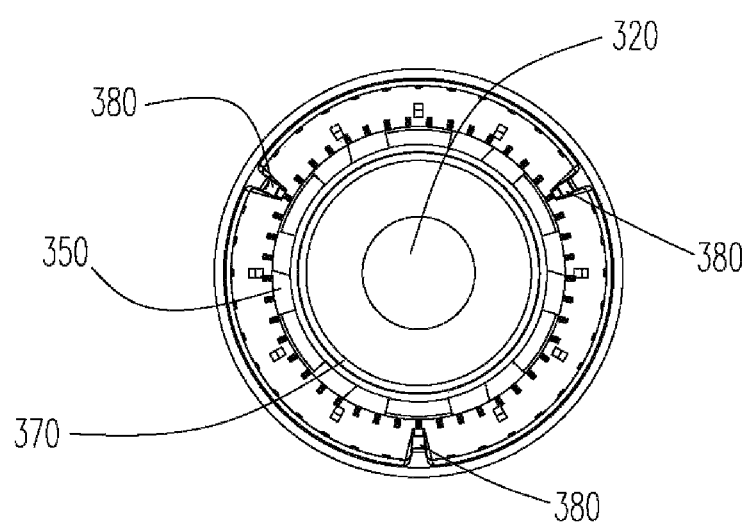
FIG. 5 is a top view of the filter of the juicer of the present invention.
Figure 6:
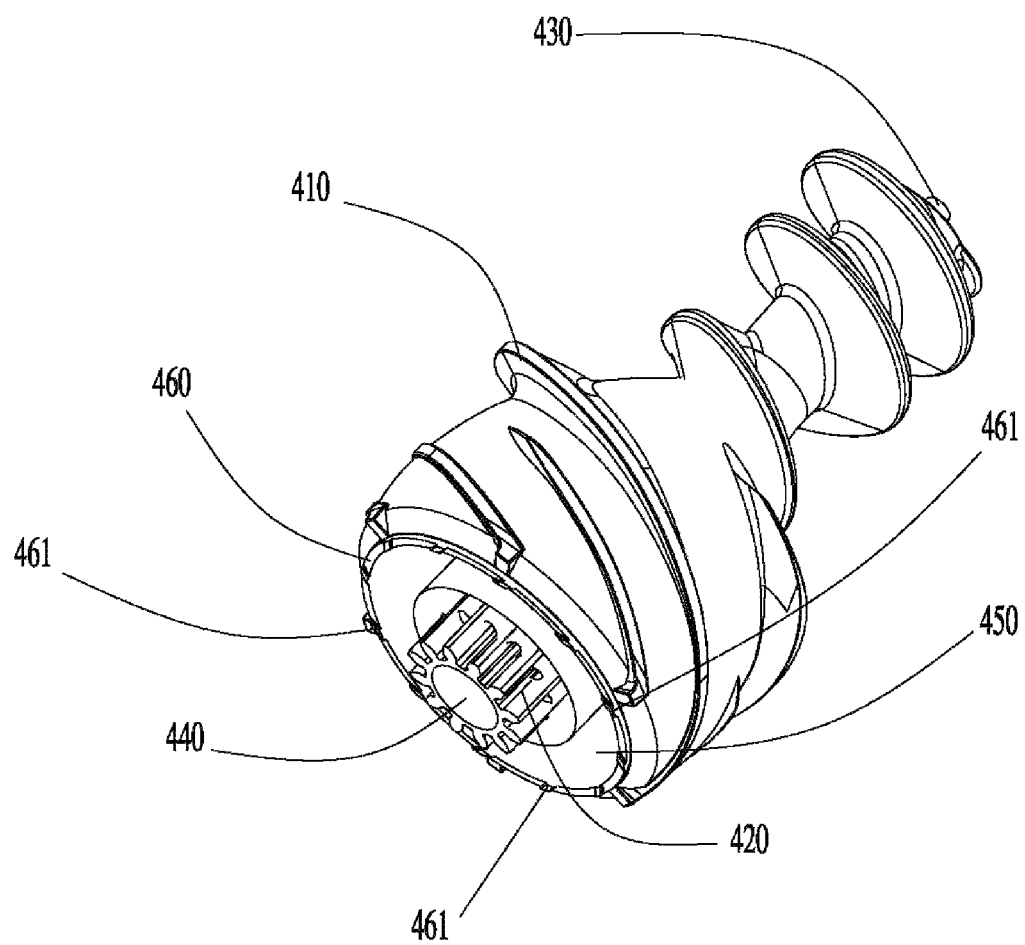
FIG. 6 is an isometric view of a rotating head of the juicer of the present invention.
Figure 7:
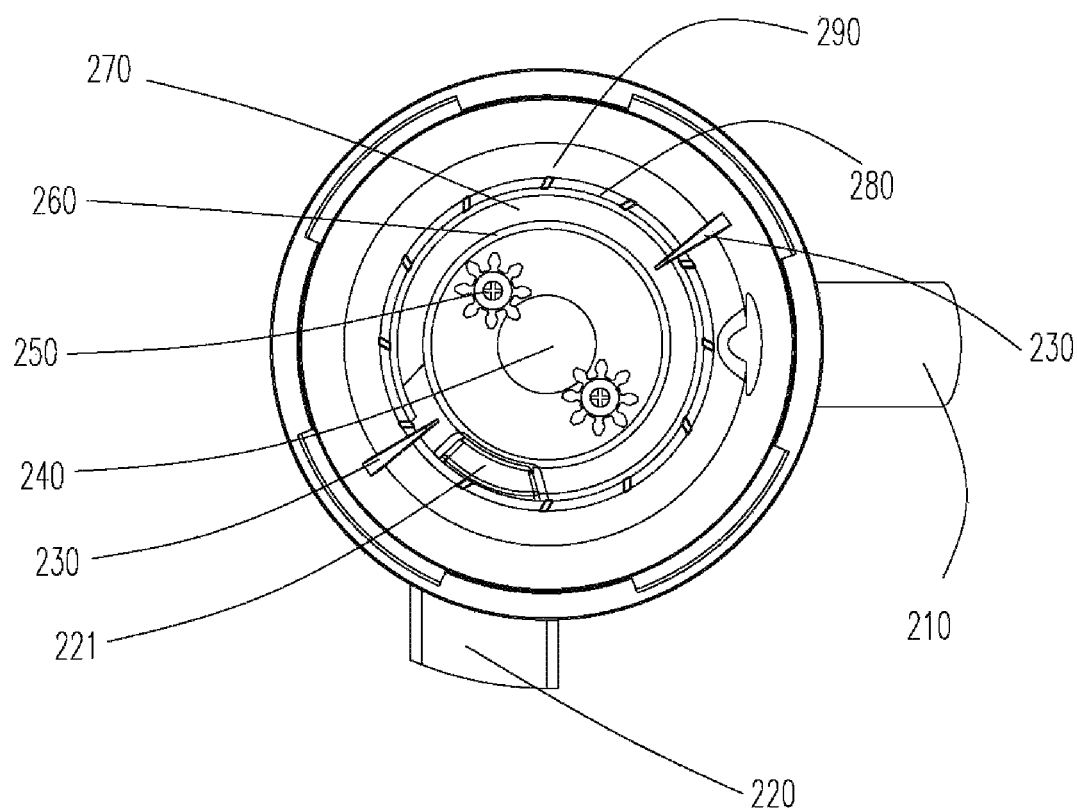
FIG. 7 is a top view of a separator of the juicer of the present invention.

Further, referring to FIGS. 5 and 6, a ring slot 450 is defined between an outer edge 460 and the center of the bottom surface of the rotating head 4. A protrusion 461 protrudes downward from the outer edge 460 of the bottom of the rotating head 4, to increase friction between the rotating head 4 and the bottom of the filter 3, for further triturating the residual of the food squeezed to the bottom end of the rotating head 4. A through hole 320 is defined in the bottom portion of the filter 3. A ring piece 370, with a greater diameter than that of the through hole 320, is disposed on periphery of the through hole 320 of the inner surface of the bottom portion of the filter 3. An outer diameter of the ring piece 370 is equal to the diameter of the ring slot 450. After assembly, the inner wall of the ring slot 450 surrounds on the periphery of the ring piece 370. When in work, some juice of the squeezed food can only flow to between the rotating head 4 and the filter 3. The juice is blocked by the outer edge 460 of the rotating head 4 and the ring piece 370 in the rotating head 4, to prevent the juice from flowing into the through hole 320 to effect the normal work of the juicer. In addition, the ring slot 450 can reduce the heavy of the rotating head 4, reduce the drive load, and save the material to cost down. An outer rim 340 is ring-shaped and protrudes downward from the periphery of through hole 320 of the outer surface of the bottom portion of the filter 3. The residual output hole 350 is defined in the periphery of the outer rim 340. The second ring slot 360 is defined in the periphery of the residual output hole 350. Referring to FIG. 7, a second through hole 240 is defined in the inner surface of the bottom end of the separator 2. A third slot 260 is defined in the periphery of the through hole 240 for receiving the outer rim 340. The periphery of the third slot 260 can receive the ring flange 280 of the second ring slot 360. A residual output platform 270 is disposed between the ring flange 280 and the third slot 260. A residual output hole 221 of the residual output opening 220 is defined in the residual output platform 270. A juice channel 290 is defined between the ring flange 280 and the inner wall of the separator 2 and communicates with the juice output opening 210 of the separator 2. After assembly, the outer rim 340 is embedded in the third slot 260. The ring flange 280 is embedded in the second ring slot 360. The rotating head 4 is arranged in the filter. A drive gear 420 is horizontally disposed on the center of the bottom end of the rotating head 4. A drive hole 440 or a drive head with a polygon section is disposed in the center of the drive gear 420 and connected to the driving end 110, for preventing skidding. The drive gear 420 has a smaller diameter than that of the through hole 320. A ring inner gear 330 is located between the through hole 320 and the outer rim 340 of the outer surface of the bottom portion of the filter 3. At least one follower gear 250 is disposed on the inner surface of the bottom portion of the separator 2. The follower gear 250 is located besides the through hole 240. The drive gear 420 meshes with the follower gear 250 through the through hole 320 and simultaneously meshes with the inner gear 330. When the juicer works, the driving end 110 provides power, to drive the drive hole 440 or the drive head to rotate. The drive gear 420 rotates synchronously, to rotate reversely the follower gear 250. The follower gear 250 meshes simultaneously with the ring inner gear 330 located on the outer surface of the bottom portion of filter 3. The follower gear 250 has a smaller diameter than that of inner gear 330. The follower gear 250 rotates the inner gear 330 in a same direction. According to the connection relation described above, when the rotating head 4 is rotated to rotate the spiral piece 410 downward, the filter 3 is rotated reversely in the periphery of the rotating head 4, to provide a larger squeezing force, so as to get a better squeezing effect and to have the follower gear 250 to more stably drive the inner gear 330. Two symmetrical follower gears 250 in opposite side of the second through hole 240, or three follower gears 250 are arranged evenly in and internally tangent with are the second through holes 240. The follower gear 250 meshes with the drive gear 420. The follower gears 250 don't mesh with each other. When in work, the drive gear 420 rotates the follower gear 250 reversely and to drive the inner gear 330 to rotate.

Further, a fixed brush 230 is longitudinally located on the inner surface of the side wall of the separator 2 and tightly touches the outer surface of the filter 3. When the through hole of the filter 3 is blocked up, the outer surface of the filter 3 touches with the fixed brush 230 during the course of rotation. The obstruction is brushed by the fixed brush 230 to be returned back into the filter 3 to be further squeezed to form the residual, and the residual is output to cause the filter 3 to easily pass through the juice.

Further, a ferrule 310 is laterally disposed on the center of the outer surface of the filter 3, a rib 380 is vertically disposed on the inner surface of the filter 3. Because the filter is generally flexible, the lateral ferrule 310 added to the center of the outer surface of the filter 3 can help to improve the compression resistance of the filter 3 and to preventing the filter 3 from being deformed. The rib 380 improves the strength of the filter 3, and simultaneously corporates with the rotating head 4 to form a joint force to function as better cutting the squeezed food, to improve the juice squeezing efficiency.

Third Embodiment

Figure 8:
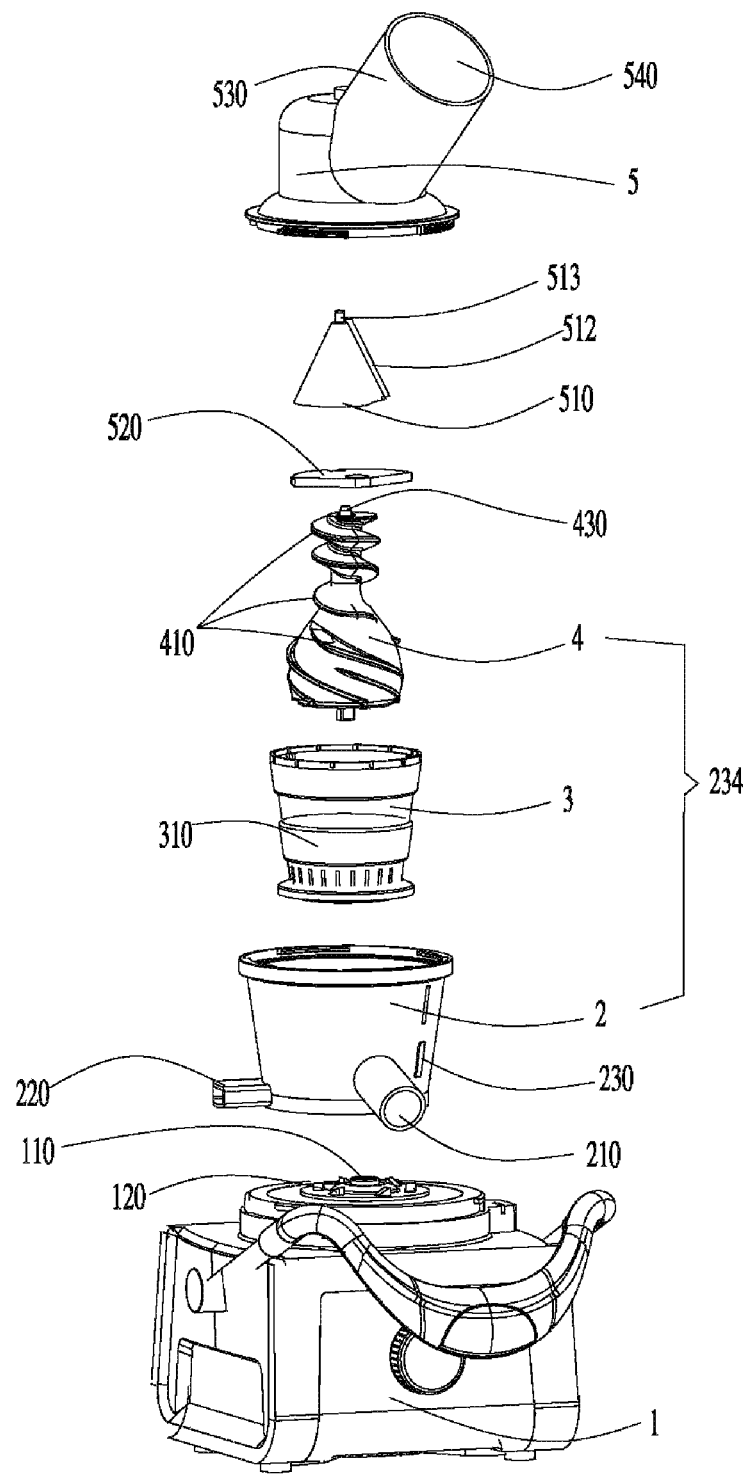
FIG. 8 is an exploded view of the juicer of a third embodiment of the present invention.
Figure 9:
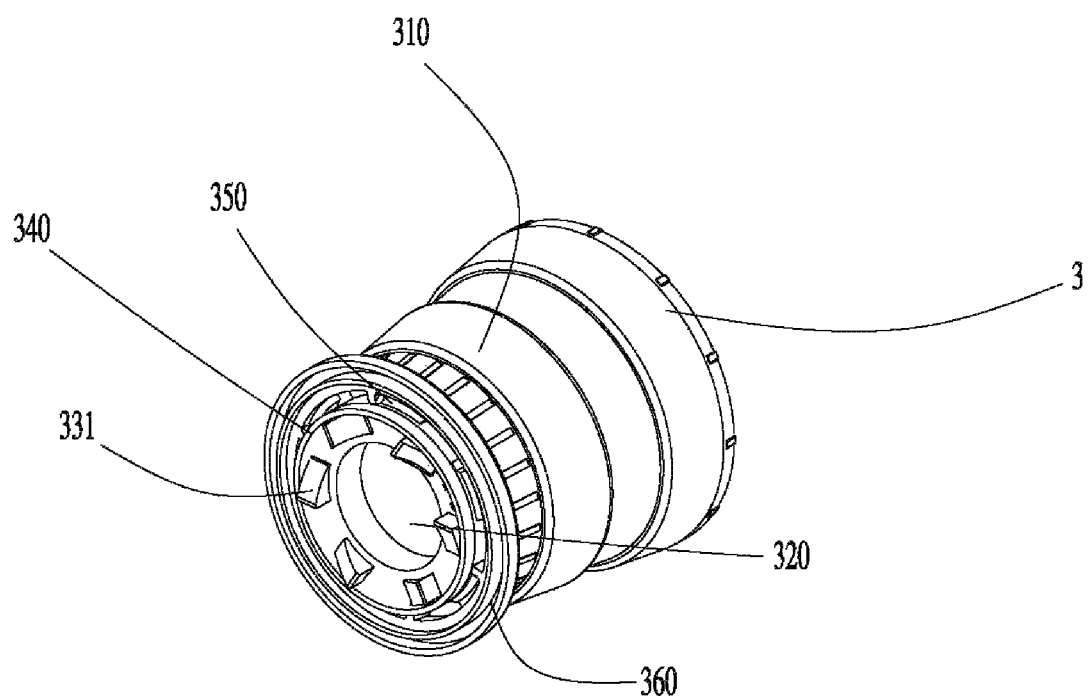
FIG. 9 is an isometric view of the filter of the juicer of the third embodiment of the present invention.
Figure 10:
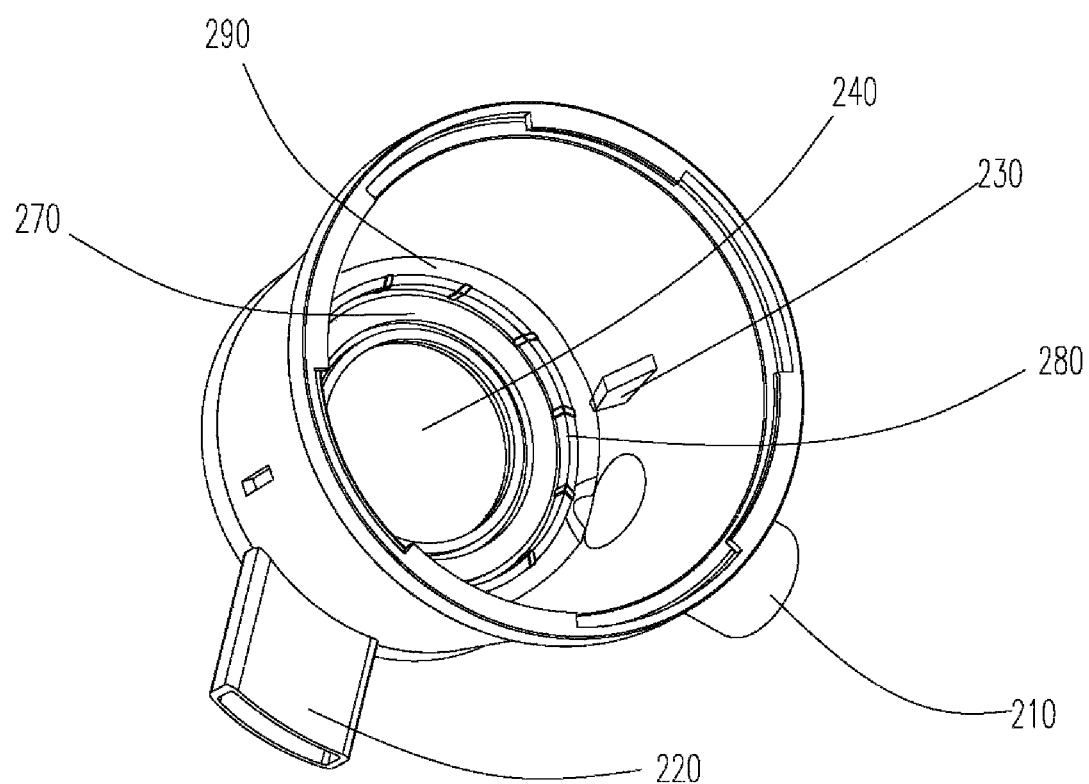
FIG. 10 is an isometric view of the separator of the juicer of the third embodiment of the present invention.

FIGS. 8, 9, and 10 illustrate a juicer provided by the present invention, which is different from the second embodiment is that a second driving end 120 is further disposed on the base 1 and extends through the through hole 240 of the separator 2 to be connected to the bottom end of the filter 3, configured for driving the filter 3 to rotate in a same or reverse direction relative to the rotating head 4, to increase squeezing force. When the food is locked, the second driving end 120 can rotate the filter 3 in the same direction to prevent damaging the juicer. At the same time, when the driving end 110 or the second driving end 120 is in malfunction, another driving end can continually work. Further, a through hole 320, configured for the driving end 110 or the center of the bottom surface of the rotating head 4 passing through, is defined in the bottom portion of the filter 3. A driver 331 is disposed between the through hole 320 and the outer rim 340 on the outer surface of the bottom portion of the filter 3. The driver 331 is connected to the driving end 120. A second through hole 240, configured for the driving end 110 and the second driving end 120 passing through, is defined in the center of the bottom portion of separator 2. With connecting structures described above, after the equipment is assembled, the driver 331 is driven by the second driving end 120 to rotate alone, that can save the driving part of the drive gear 410, the follower gear 250, and the inner gear 330 of the first embodiment, to simplify the mechanical part of the juicer, the assembly is more simple, and the rate of failure thereof is low.

Fourth Embodiment

Figure 11:
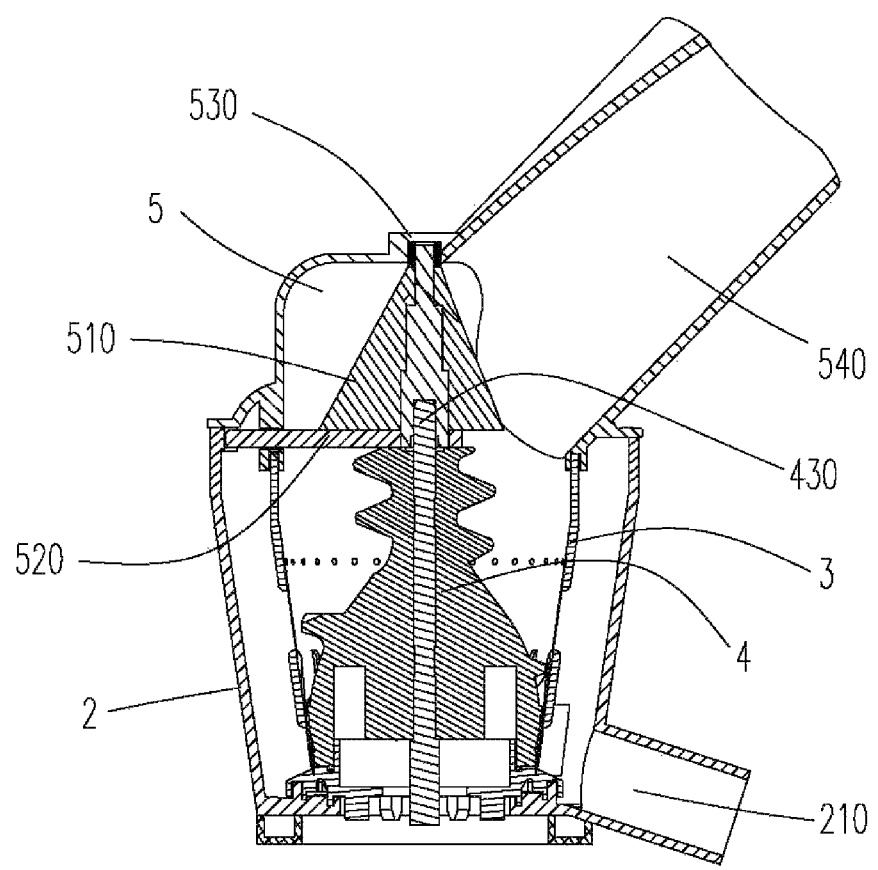
FIG. 11 is a cross-sectional view of an assembly of the squeezing device and the top cover of the juicer of a fourth embodiment of the present invention.

FIG. 2 and FIG. 11 illustrate a juicer provided by the present invention, which is mainly different from the above embodiments is that a cutting quantity controller 520 is disposed on a top edge of the separator 2. The cutting quantity controller 520 is sector in shape, and a top thereof defines a through hole 521, for the connecting shaft 430 of the rotating head 4 or the connecting shaft in the center of the bottom surface of the pre-triturating device passing through. The cutting quantity controller is arranged above the rotating head 4. The cutting quantity controller 520 is fixed on the top edge of the separator 2. After the cutting quantity controller 520 is installed on the top edge of the separator 2 by user, the top cover 5 is then hermetically assembled to the separator 2, to avoid the cutting quantity controller 520 to be easily fallen, which easy happens in the embodiments described above when the top cover 5 is installing, and it is more inconvenient to have the user to assemble, disassemble and clean.

The disclosure described above is only better embodiments of the present invention and cannot restrict the invention. Any change, equivalent replacement, and improvement, etc., according to the spirit and the principle of the present invention, should be covered in the protection scope of the invention.

The invention claimed is:

1. A juicer, comprising a base with a driving mechanism, a squeezing device located above the base, a top cover with a food input opening located above the squeezing device, wherein a pre-triturating device is disposed between the squeezing device and the top cover; wherein the squeezing device comprises: a separator capable of separately discharge juice and residual of the squeezed food; a filter capable of filtering the residual of the squeezed food; and a rotating head capable of rotating to spirally squeeze the squeezed food; wherein the bottom of the sidewall of the separator defines a juice output opening therein, the bottom of the separator defines a residual output opening therein, the bottom of the filter defines a residual output hole moveably communicating with the residual output opening, a downward spiral piece is located on the outer surface of the rotating head, the rotating head is located in the separator, the filter surrounds between the rotating head and the separator, a driving end of the driving mechanism of the base is connected to a center of a bottom of the rotating head, and the rotating head is rotated reversely to the filter, wherein the pre-triturating device is cone in shape, at least one blade is disposed on the cone surface, a connecting shaft or a shaft hole is respectively disposed on a tip and a center of a bottom surface of the pre-triturating device and in connection with the food processing machine; wherein a horizontal blade, a vertical blade, and an oblique blade are all disposed on the cone surface of the pre-triturating device, and the pre-triturating device is configured to cut food into pieces before the food is spirally squeezed by low speed rotations of the rotating head.

2. The juicer of claim 1, wherein a shaft hole or a connecting shaft is disposed on the inner surface of the top portion of the top cover and in connection with the connecting shaft or the shaft hole of the tip of the pre-triturating device, a shaft hole or a connecting shaft is disposed on the top of the rotating end and in connection with the connecting shaft or the shaft hole of the center of the bottom surface of the pre-triturating device.

3. The juicer of claim 2, wherein a cutting quantity controller is arranged on a bottom edge of the top cover, the cutting quantity controller is sector in shape, and a top thereof defines a through hole configured for the connecting shaft of the rotating head or the connecting shaft of the center of the bottom surface of the pre-triturating device passing through.

4. The juicer of claim 2, wherein a cutting quantity controller is arranged on a top edge of the separator, the cutting quantity controller is sector in shape, and a top thereof defines a through hole for the connecting shaft of the rotating head or the connecting shaft of the center of the bottom surface of the pre-triturating device inserting through.

5. The juicer of claim 3, wherein a ring slot is defined between an outer edge and the center of the bottom end of the rotating head, a protrusion protrudes downward from the outer edge of the bottom end of the rotating end, a ring piece, with a greater diameter than that of the through hole, is disposed in the periphery of the through hole of the inner surface of the filter, an outer diameter of the ring piece is equal to the diameter of the ring slot, the bottom portion of the filter defines the through hole, a ring outer rim protrudes downward from the periphery of the through hole of the outer surface of the bottom portion of the filter, the residual output hole is defined in the periphery of the outer rim, a second ring slot is defined in the periphery of the residual output hole, the inner surface of the bottom portion of the separator defines a second through hole, the periphery of the second through hole defines a third slot configured to receive the outer rim, a ring flange is disposed on the periphery of the third slot and configured to be received in the second ring slot, a residual output platform is disposed between the ring flange and the third slot, the residual output hole of the residual output opening is defined in the residual output platform, a ring juice channel is disposed between the ring flange and the inner sidewall of the separator and communicates with the juice output opening of the separator.

6. The juicer of claim 5, wherein a fixed brush is longitudinally disposed on the inner surface of the sidewall of the separator and tightly touches the outer surface of the filter.

7. The juicer of claim 6, wherein a ferrule is laterally disposed on the center of the outer surface of the filter, and a rib is vertically disposed on the inner surface of the filter.

8. The juicer of claim 7, wherein a drive gear is horizontally disposed on the center of the bottom end of the rotating head, a drive hole or a drive head with a polygonal section is disposed in the center of the drive gear, a diameter of the driving gear is less than that of through hole, a ring inner gear is disposed between the through hole and the outer rim in the outer surface of the bottom of the filter, at least one follower gear is disposed on inner surface of the bottom portion of the separator, the follower gear is located beside the second through hole, the drive gear is inserted through the through hole to mesh with the follower gear, the follower gear simultaneously meshes with the inner gear.

9. The juicer of claim 7, wherein a second driving end is further disposed on the base, a driver is disposed between the through hole and the outer rim of the outer surface of the bottom portion of the filter, the driver is connected to the second driving end, and a diameter of the second through hole is greater than that of the driver.

* * * * *